US010765981B2

(12) United States Patent
Padovan et al.

(10) Patent No.: US 10,765,981 B2
(45) Date of Patent: Sep. 8, 2020

(54) MOISTURE SEPARATOR CONFIGURATION

(71) Applicant: General Electric Technology GmbH, Baden (CH)

(72) Inventors: Loris Padovan, Baden (CH); Alessandro Sgambati, Möhlin (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/280,994

(22) Filed: May 19, 2014

(65) Prior Publication Data

US 2014/0360708 A1    Dec. 11, 2014

(30) Foreign Application Priority Data

Jun. 6, 2013    (EP) .................................... 13170731

(51) Int. Cl.
| | | |
|---|---|---|
| *B01D 45/00* | (2006.01) | |
| *B01D 45/08* | (2006.01) | |
| *F22B 37/26* | (2006.01) | |
| *B01D 45/16* | (2006.01) | |
| *B01D 45/12* | (2006.01) | |
| *B01D 45/06* | (2006.01) | |
| *B01D 50/00* | (2006.01) | |

(52) U.S. Cl.
CPC .............. *B01D 45/08* (2013.01); *B01D 45/06* (2013.01); *B01D 45/12* (2013.01); *B01D 45/16* (2013.01); *F22B 37/26* (2013.01); *B01D 50/002* (2013.01)

(58) Field of Classification Search
CPC ........ B01D 45/08; B01D 45/16; B01D 45/12; B01D 50/002; B01D 45/06; F22B 37/26
See application file for complete search history.

(56) References Cited

U.S. PATENT DOCUMENTS

| | | | | |
|---|---|---|---|---|
| 3,338,035 A | * | 8/1967 | Dinkelacker | .......... B01D 45/08 55/440 |
| 3,358,580 A | * | 12/1967 | Freese | .................... B01D 45/08 454/277 |
| 3,870,488 A | * | 3/1975 | Arndt | ..................... B01D 45/08 55/440 |
| 3,912,471 A | * | 10/1975 | Cotton, Jr. | ............. B01D 45/08 55/440 |
| 3,953,183 A | * | 4/1976 | Regehr | .................. B01D 45/16 55/440 |

(Continued)

FOREIGN PATENT DOCUMENTS

| | | |
|---|---|---|
| DE | 422361 | 11/1925 |
| EP | 0234224 A2 | 9/1987 |

(Continued)

*Primary Examiner* — Dung H Bui
(74) *Attorney, Agent, or Firm* — Grogan, Tuccillo & Vanderleeden, LLP

(57) ABSTRACT

Moisture separator configuration for separating water droplets from steam of a flow having a mixture of steam and water droplets, such that the cited flow travels through the moisture separator configuration so that this separation is achieved. The moisture separator configuration includes a plurality of plates oriented in line with the flow. The plurality of plates form channels through which the flow travels. The channels have progressive cross section variation along the flow direction, in order to collect progressively the water droplets separated from the steam in the flow.

7 Claims, 3 Drawing Sheets

(56) References Cited

U.S. PATENT DOCUMENTS

| | | | |
|---|---|---|---|
| 4,175,938 A * | 11/1979 | Regehr | B01D 45/16 |
| | | | 55/440 |
| 4,198,215 A * | 4/1980 | Regehr | B01D 45/08 |
| | | | 55/440 |
| 4,430,101 A * | 2/1984 | Sixsmith | B01D 45/06 |
| | | | 55/440 |
| 4,494,486 A | 1/1985 | Mendler | |
| 4,508,552 A * | 4/1985 | Ovard | B01D 45/08 |
| | | | 55/440 |
| 4,530,707 A * | 7/1985 | Ovard | B01D 45/06 |
| | | | 55/440 |
| 4,557,740 A * | 12/1985 | Smith | B01D 45/06 |
| | | | 55/440 |
| 4,581,051 A * | 4/1986 | Regehr | B01D 45/16 |
| | | | 55/440 |
| 4,802,901 A * | 2/1989 | Wurz | B01D 45/06 |
| | | | 55/440 |
| 5,104,431 A * | 4/1992 | Fewel, Jr. | B01D 45/08 |
| | | | 55/440 |
| 5,268,011 A * | 12/1993 | Wurz | B01D 45/08 |
| | | | 55/294 |
| 5,709,264 A | 1/1998 | Sweeney et al. | |
| 2007/0137154 A1 * | 6/2007 | Agnello | B01D 45/08 |
| | | | 55/440 |
| 2010/0247305 A1 | 9/2010 | Ewida et al. | |
| 2010/0326026 A1 * | 12/2010 | Bratton | B01D 45/08 |
| | | | 55/440 |
| 2011/0005471 A1 | 1/2011 | Fujita et al. | |
| 2012/0131891 A1 | 5/2012 | Nishiura et al. | |
| 2014/0017066 A1 * | 1/2014 | Stucki | B01D 45/04 |
| | | | 415/115 |
| 2015/0135661 A1 * | 5/2015 | MacDonald | F24F 13/082 |
| | | | 55/440 |

FOREIGN PATENT DOCUMENTS

| | | |
|---|---|---|
| GB | 2489511 | 10/2012 |
| JP | 475440 U | 9/1972 |
| JP | S51-45376 A | 4/1976 |
| JP | 5490851 A | 7/1979 |
| JP | 2002126429 | 5/2002 |
| JP | 2011-078874 | 4/2011 |
| JP | 2012-112977 A | 6/2012 |
| KR | 10-1997-0066502 | 10/1997 |
| KR | 10-2010-0061189 | 6/2010 |
| RU | 2097113 C1 | 11/1997 |
| SU | 187505 | 10/1966 |
| WO | 2014167329 A1 | 10/2014 |

* cited by examiner

MOISTURE SEPARATOR CONFIGURATION

CROSS-REFERENCE TO RELATED APPLICATIONS

This application claims priority to European application 13170731.7 filed Jun. 6, 2013, the contents of which are hereby incorporated in its entirety.

TECHNICAL FIELD

The present invention relates to a moisture separator configuration providing increased effectiveness, particularly used in power plants.

BACKGROUND

A moisture separator, also known as droplets separator, is a device for separating water droplets from steam. Moisture separators are widely used in the oil and gas industries to remove liquid droplets from a gas or steam. In general mist removal is necessary for several reasons, as explained below.

One reason is to increase the cycle efficiency of a power plant. Usually, in thermal power plants, the steam generated from a boiler is expanded several times in so called High (H), Middle (M) and Low Pressure Turbines (LPT). In a Nuclear Power Plant, during the first expansion in the HPT of the superheated or saturated steam coming from the boiler, nucleation phenomena occurs along the HPT cylinder and the resulting working fluid at the HPT exhausts is humid steam with a certain steam quality. Before re-heating the humid steam for efficiency reasons upstream MPT and LPT, a mechanical separation of the moisture from the saturated steam is accomplished through moisture separators: the resulting working fluid sent to the re-heater bundles is humid steam with low moisture content. Since the latent heat of evaporation of water is significantly high, it is preferred to eliminate the water content in the humid steam and send the collected water back in the thermodynamic cycle, instead of using a lot of energy for the moisture evaporation, limiting thermal loads on the bundles, as well, caused by the evaporation processes.

Another benefit achieved by removing the moisture content is the protection of downstream equipment from erosion damages. A type of moisture separators are the so-called wave-plate mist eliminators, which are widely used in the oil and gas industries as well as power generation industry, to remove liquid droplets from a gas or steam phase. Most separators use the principle of inertia, whereby larger water droplets tend to continue in a straight line when the direction of flow of an air/steam stream, in which these water droplets are carried, is changed. These wave-plate mist eliminators comprise a plurality of narrowly spaced wave-shaped bended metal sheets, oriented in line with the air/steam flow path. The two-phase flow (mixture of steam and water droplets) is forced to travel through the tortuous channels and to change repeatedly flow direction. The water droplets, that due to their inertia are not able to follow these changes in direction, deviate from the main flow and impact on the channel walls, where they adhere and coalesce. When the amount of liquid is sufficiently high a film and liquid rivulets are formed, which are continuously drained out from the wave-plate mist eliminator by gravity. The inertia of the drops and the drag of the steam control the motion of the drops through the channels.

The present invention is directed towards a moisture separator having increased effectiveness compared to moisture separator in the prior art.

SUMMARY

The present invention relates to a moisture separator configuration particularly used in power plants. The moisture separator configuration comprises a plurality of plates, preferably a plurality of metal sheets bended into a wave shape, these plates being oriented in line with a flow that comprises gas/steam and water droplets and travels through the cited moisture separator configuration, such that the water droplets are effectively separated from the steam after the flow has traveled through the moisture separator configuration. The water droplets that have been separated from the steam are collected at the plates walls such that, when the amount of these water droplets is sufficiently high, a liquid film or rivulets are formed, which are then drained out from the plates by gravity.

The moisture separator configuration of the invention has the following characteristics:
  each of the plates comprises a non-impinging wall side and an impinging wall side: the non-impinging wall side having a smooth surface whereas the impinging wall side comprises a plurality of longitudinal grooves configuring a plurality of drainage channels for helping reducing the present film thickness, hence reducing the risk of re-entrainments at a critical gas/steam velocity and draining the liquid film accumulated at the plates walls;
  the coupling of each pair of plates configures a Venturi channel aimed at preventing re-entrainment effects due to steam streamlines separation/detachment from the plates walls;
  the coupling of each pair of plates configures a first concave shaped cavity for entrapping the accumulated water droplets, preventing the direct exposure to high/steam flow velocity;
  a second concave shaped cavity is configured at the end of the plates in the moisture separator configuration for entrapping water droplets not yet trapped by the first concave shaped cavity, separating these water droplets from the steam;
  a wall step is also configured when two plates are put together at the end part of the moisture separator configuration, in order to uncouple the water film from the action of the shear force exerted by the steam in the area where the wall step is formed;
  an intermediate region having increased turbulent dispersion is configured in order to increase the separation of small water droplets that still remain and that have not been collected yet, separating these small water droplets from the steam.
  a plurality of window openings are provided in the plates, forming a passage for the steam, acting at the same times as a structural device, preventing vibrations in the moisture separator configuration.

The moisture separator configuration according to the present invention is therefore able to provide a retention system having high effectiveness and where progressive water droplet collection is achieved.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
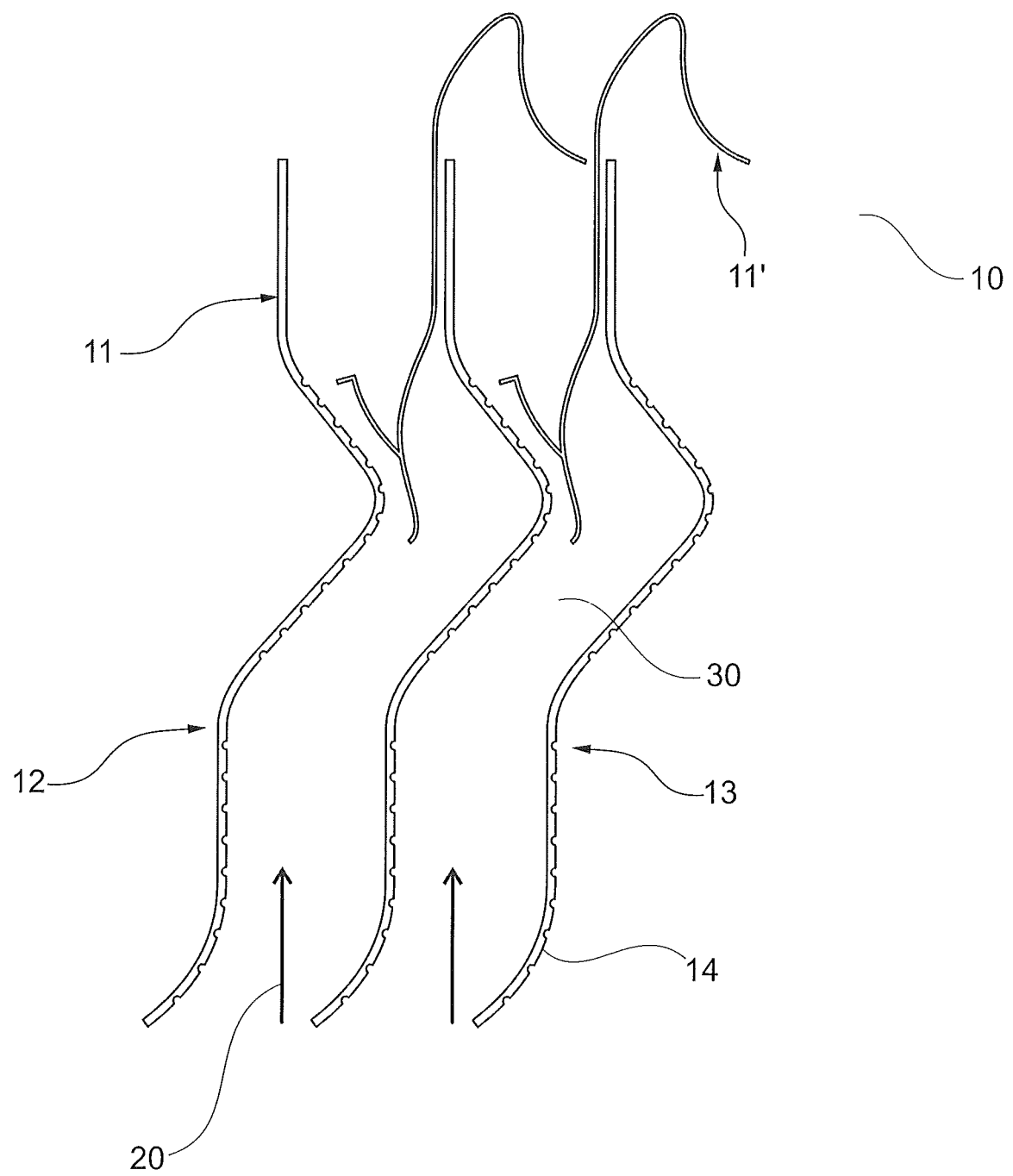
FIG. 1 shows a top view of the moisture separator configuration providing increased effectiveness, according to the present invention.
Figure 2:
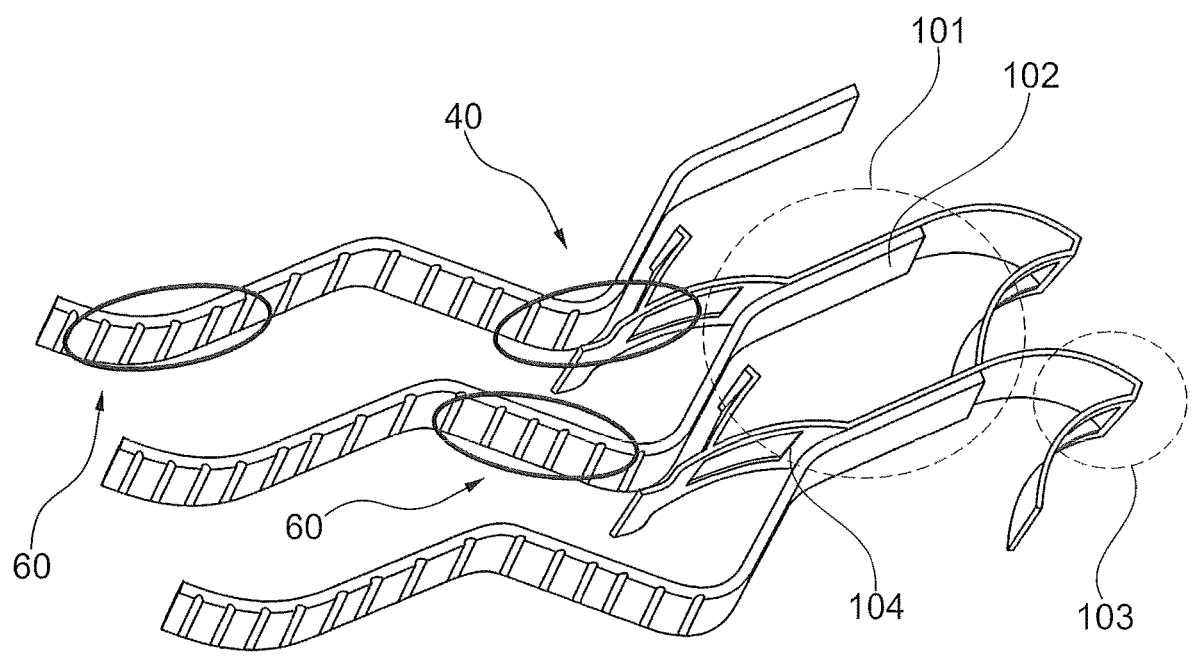
FIG. 2 shows a side view of the moisture separator configuration providing increased effectiveness, according to the present invention.
Figure 3:
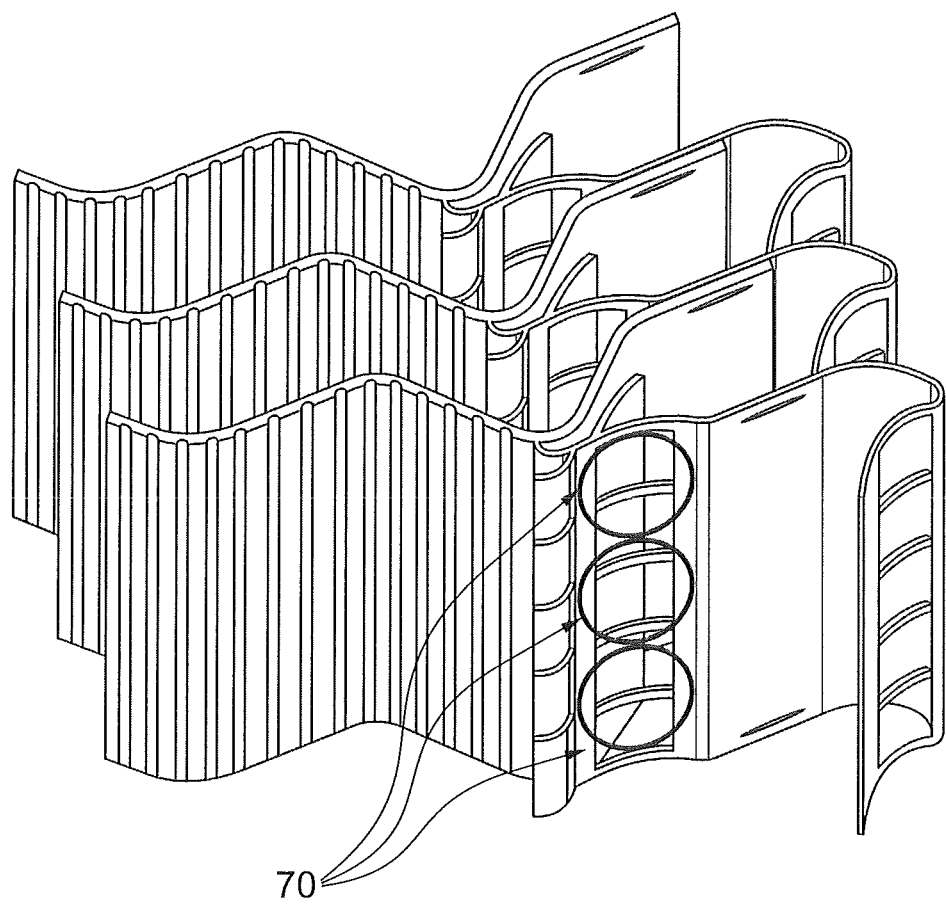
FIG. 3 shows a bottom view of the moisture separator configuration providing increased effectiveness, according to the present invention.

The present invention relates to a moisture separator configuration 10 comprising a plurality of plates 11, preferably a plurality of metal sheets bended into a wave shape, as shown in any of FIG. 1, 2 or 3. The plurality of plates 11 form channels 30 through which a flow 20 is conducted: the plates 11 are oriented in line with the flow 20 that travels through the cited moisture separator configuration 10, this flow 20 comprising a mixture of steam and water droplets. The water droplets are separated from the steam while the flow 20 is traveling through the moisture separator configuration 10. When the amount of water droplets collected at the walls of the plates 11 is sufficiently high, a liquid film is formed, which is then drained out from the plates 11 by gravity. Each of the plates 11 in the moisture separator configuration 10 comprises a non-impinging wall side 12 and an impinging wall side 13, the non-impinging wall side 12 having a smooth surface and the impinging wall side 13 comprising a plurality of longitudinal grooves 14, configuring a plurality of drainage channels 60 for helping the drainage of the water droplets collected at the plates walls and reducing the average wall film thickness, hence uncoupling the steam from the water film, by reducing the effect of the shear forces and consequently the water drag, acting at the level of the steam/water film interface. The coupling of each pair of plates 11 and 11' (see FIG. 2) configures a Venturi channel 40 that prevents re-entrainment effects due to steam streamlines separation/detachment from the profile of the walls induced by opposed pressure gradients. Besides, the coupling of each pair of plates 11 and 11' also configures a first concave shaped cavity 104 for entrapping water droplets and for preventing the water film transportation on the non-impinging wall side 12.

Each of the plates 11 comprises a non-impinging wall side 12, which is smooth, while the other side comprises longitudinal grooves 14 on the impinging wall side 13. These longitudinal grooves 14 are provided to help the drainage of the water droplets collected from the flow 20 preventing/limiting water film drag. The impinging wall side 13 of each one of the plates 11 comprising drainage channels 60 deviates the water droplets, as a change of direction of the carrying steam in the flow 20 when travelling through the channels 30 has the tendency to impinge mostly onto the impinging wall side 13 of the plate 11.

The drainage channels 60 have three functions:
a) decrease the interfacial shear force acting on the water film surface (between the flow 20, which is the carrying media, and the water film), once the water film enters into the drainage channels 60, avoiding as much as possible the water film transportation towards the outlet of the moisture separator configuration 10; and b) increase the gravitational forces of the water thanks to an accumulation of the water itself in the drainage channels 60, helping the drainage; and
c) reduce the average wall film thickness.

The coupling of two plates 11 and 11' results in a sort of Venturi channel 40 and in a first concave shaped cavity 104 aimed at entrapping the water collected in the non-impinging wall side. The Venturi channel 40 is aimed at sucking the water film inside the Venturi itself (to avoid choking just in front of the Venturi channel) and, at the same time, preventing the water film detachment from the impinging wall side 13 of the plate 11, due to turbulent separation of the carrying media (flow 20), occurring just after the curvature of the plate 11 in correspondence to the inlet of the Venturi channel 40, effect known as re-entrainment in the literature for this kind of waved plates moisture separators. In the opposite side of the Venturi channel 40, the initial width of the channels 30 is reduced because of the room occupied by the Venturi itself and, thanks to a reduction of the cross section of the remaining part of the channels 30 because of window openings and the bending of the channels 30, the remaining water droplets in the flow 20 will be accelerated and, as they will not be able to follow the strong change of direction of the flow 20 (carrying media), they will impinge onto the non-impinging wall side 12 of the plates 11, therefore forming a water film that will be collected and drained out thanks to the first concave shaped cavities 104.

The moisture separator configuration 10 of the invention comprises at least a second concave shaped cavity 103 configured at the end of the plate 11, to drain water film transported out of the Venturi channel 40, if not drained yet, and for entrapping water droplets not yet trapped by the first concave shaped cavity 104, separating these water droplets from the steam (see FIG. 2). Besides, a wall step 102 is also configured when two plates 11 and 11' are brought together at the end part of the moisture separator configuration 10, in order to uncouple the water film from the action of the shear force exerted by the steam in the area where the wall step 102 is formed.

FIG. 2 shows an intermediate region 101 with an increased turbulent dispersion, which is configured in order to increase the collection of small water droplets that still remained and that have not been collected yet, separating these small water droplets from the steam in the flow 20.

The moisture separator configuration 10 of the invention also comprises a plurality of window openings 70 (see FIG. 3) forming a passage to the flow 20 and at the same time acting as a structural device, shaping the channels 30 and preventing vibrations in the moisture separation configuration 10.

In general, moisture separators are used in marine gas turbine and industrial applications. In power plants, mist removal is necessary for several reasons:
One reason is to increase the cycle efficiency of a power plant: dealing with a thermal cycle where the steam is expanded several times by means of HPT (High Pressure Turbine), MPT and LPT (Medium and Low Pressure Turbines), the steam undergoes a reheating process in order to increase its enthalpy after being expanded and before being processed by the next turbine. Since the latent heat of evaporation is considerably high, the moisture content of humid steam is separated mechanically instead of getting rid of it by means of evaporation processes.
Another benefit achieved by removing the moisture content is the protection of downstream equipment from erosion damages.

The main advantages of the moisture separator configuration 10 of the invention over the known configurations in the prior art are the following:

Higher dynamic pressure for which re-entrainment effects occur;

Higher plates and consequently less components are necessary to collect the water at the bottom of the separator plate (gutters);

Shorter plates with respect to the direction of the steam;

Modularity.

Although the present invention has been fully described in connection with preferred embodiments, it is evident that modifications may be introduced within the scope thereof, not considering this as limited by these embodiments, but by the contents of the following claims.

The invention claimed is:

1. A moisture separator configuration for separating water droplets from steam of a flow having a mixture of the steam and the water droplets, such that the flow travels through the moisture separator configuration so that the separation of the water droplets from the steam is achieved, the moisture separator configuration comprising:
a first plurality of plates oriented in line with the flow, wherein the first plurality of plates form channels through which the flow travels, the channels having progressive cross-section variation along the flow direction, in order to collect progressively the water droplets separated from the steam in the flow, wherein each one of the first plurality of plates includes a plurality of longitudinal grooves on one of its wall sides defining a plurality of drainage channels; and
a second plurality of plates;
wherein a first plate of the first plurality of plates includes a convex bend that protrudes into one of the channels through which the flow travels, towards an adjacent, second plate of the first plurality of plates; and
a first plate of the second plurality of plates extends across the one of the channels towards the convex bend of the first plate of the first plurality of plates;
wherein the Venturi channel is formed between the convex bend of the first plate of the first plurality of plates and a portion of the first plate of the second plurality of plates located adjacent to the convex bend;
wherein the second plate of the first plurality of plates and the first plate of the second plurality of plates forms a first concave shaped cavity therebetween for entrapping small water droplets, for separating the small water droplets from the steam in the flow, and for preventing water film transportation on the non-impinging wall side;
wherein each of the second plurality of plates includes a plurality of window openings forming a passage for the flow and inhibits vibrations in the moisture separator configuration.

2. The moisture separator configuration according to claim 1, wherein:
wherein the respective pairs of plates of one of the first plurality of plates and one of the second plurality of plates are directly coupled to each other.

3. The moisture separator configuration according to claim 1, wherein:
at least a subset of the plurality of longitudinal grooves of at least one of the respective pairs of plates are located within the Venturi channel.

4. The moisture separator configuration according to claim 1, wherein:
the concave shaped cavity is located at an approximate same downstream location of the channel through which the flow travels as the Venturi channel, such that the first plate of the second plurality of plates separates the Venturi channel from the concave shaped cavity.

5. A moisture separator configuration for separating water droplets from steam of a flow having a mixture of the steam and the water droplets, such that the flow travels through the moisture separator configuration so that the separation of the water droplets from the steam is achieved, the moisture separator configuration comprising:
a first plurality of plates oriented in line with the flow, the first plurality of plates including at least a first plate and a second plate forming a flow channel therebetween, the first plate including a convex bend that extends into the flow channel towards the second plate; and
a second plurality of plates, the second plurality of plates including at least a third plate extending from a point adjacent to the second plate across the flow channel towards an apex of the convex bend of the first plate;
wherein the convex bend of the first plate and a portion of the third plate form a Venturi channel therebetween;
wherein the second plate of the first plurality of plates and the third plate of the second plurality of plates forms a first concave shaped cavity therebetween; and
wherein the third plate includes a plurality of window openings forming a passage for the flow and inhibiting vibrations in the moisture separator configuration, one window opening of the plurality of window openings being located in the concave shaped cavity.

6. The moisture separator configuration of claim 5, further comprising:
a first array of longitudinal drainage channels formed in a flow channel-facing surface of the first plate, the first array of longitudinal drainage channels located upstream from the convex bend in the first plate; and
a second array of longitudinal drainage channels formed in the flow channel-facing surface of the first plate, the second array of longitudinal drainage channels located on the convex bend and extending from a point on the first plate upstream from the apex, to a point on the first plate downstream from the apex.

7. The moisture separator configuration of claim 6, wherein:
the concave shaped cavity is located at an approximate same downstream location of the flow channel as the Venturi channel, such that the third plate separates the Venturi channel from the concave shaped cavity.

* * * * *